United States Patent
Sato (10) Patent No.: US 10,632,690 B2
(45) Date of Patent: Apr. 28, 2020

(54) RESONATOR FOR JOINING OR RECEPTION JIG FOR JOINING

(71) Applicant: ULTEX CORPORATION, Fukuoka-shi, Fukuoka (JP)

(72) Inventor: Shigeru Sato, Fukuoka (JP)

(73) Assignee: ULTEX CORPORATION, Fukuoka-shi, Fukuoka (JP)

( * ) Notice: Subject to any disclaimer, the term of this patent is extended or adjusted under 35 U.S.C. 154(b) by 155 days.

(21) Appl. No.: 16/017,270

(22) Filed: Jun. 25, 2018

(65) Prior Publication Data
US 2019/0001583 A1      Jan. 3, 2019

(30) Foreign Application Priority Data
Jun. 29, 2017   (JP) ................ 2017-128129

(51) Int. Cl.
*B32B 37/00*   (2006.01)
*B29C 65/00*   (2006.01)
(Continued)

(52) U.S. Cl.
CPC ...... *B29C 66/81422* (2013.01); *B23K 20/106* (2013.01); *B29C 65/08* (2013.01);
(Continued)

(58) Field of Classification Search
USPC ...................................... 156/580.1
See application file for complete search history.

(56) References Cited

U.S. PATENT DOCUMENTS 4,534,818 A * 8/1985 Kreager ............ B29C 66/81431
                                                       156/466
9,272,466 B2 * 3/2016 Hull ..................... B65B 51/225
(Continued)

FOREIGN PATENT DOCUMENTS

WO      2014/024802 A1    2/2014

OTHER PUBLICATIONS

Principle of Ultrasonic Metal Joining (Technical Description), Cosmo System Co,. Ltd. [searched on Sep. 7, 2016: Internet: <URL:http://www.cosmo-stm.com/usmetal/about-us-metal-welding.html>].

*Primary Examiner* — James D Sells
(74) *Attorney, Agent, or Firm* — Sughrue Mion, PLLC; Richard C. Turner (57) ABSTRACT

A distal end portion on a side of an object to be joined of a resonator for joining is so configured that a plurality of protrusions each having an outer face not including an angular shape edge are stacked in two or more steps in a direction in which the resonator for joining and a reception jig for joining oppose to each other and that a shape of a protrusion on the side of the object to be joined is made smaller than a shape of a protrusion on a side of the resonator for joining. With this configuration, it is possible in the process of joining the object to be joined to first concentrate energy of acoustic vibration or ultrasonic vibration on a protrusion having a smaller shape serving as a first step protrusion to trigger to start displacement, then smoothly join, by a protrusion having a larger shape serving as a second step protrusion, a part of the object to be joined existing around the protrusion having the smaller shape, whereby metal foils can be joined without using a protection member for protection of the metal foils. A distal end portion having a plurality of protrusions stacked in two or more steps may be provided in the reception jig.

3 Claims, 5 Drawing Sheets

(51) Int. Cl.
*B23K 20/10* (2006.01)
*B29C 65/08* (2006.01)

(52) U.S. Cl.
CPC ...... *B29C 65/081* (2013.01); *B29C 66/73921* (2013.01); *B29C 66/742* (2013.01); *B29C 66/7461* (2013.01); *B29C 66/81427* (2013.01); *B29C 66/81429* (2013.01); *B29C 66/8322* (2013.01); *B29C 66/81417* (2013.01); *B29C 66/81433* (2013.01)

(56) References Cited

U.S. PATENT DOCUMENTS 10,414,098 B2 * 9/2019 Aurand ................ B29C 66/849
2019/0202587 A1 * 7/2019 Yuhara ................ B29C 65/7451

* cited by examiner

RESONATOR FOR JOINING OR RECEPTION JIG FOR JOINING

BACKGROUND OF INVENTION

1. Field of Invention

The present invention relates to a resonator for joining or a reception jig for joining where a shape of a distal end portion of the resonator for joining for pressing down an object to be joined or a shape of a distal end portion of the reception jig for joining for pressing down the object to be joined is devised so that joining of metal foils can be performed by ultrasonic vibration or acoustic vibration at least without a protection member protecting the metal foils from the distal end portions.

2. Description of the Related Art

Figure 4:
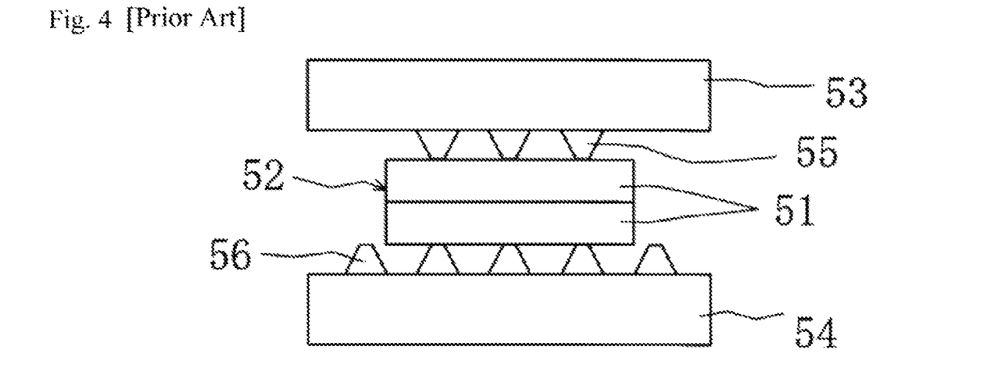
FIG. 4 is a schematic diagram showing metal joining disclosed in Non-Patent Literature 1.
Figure 5:
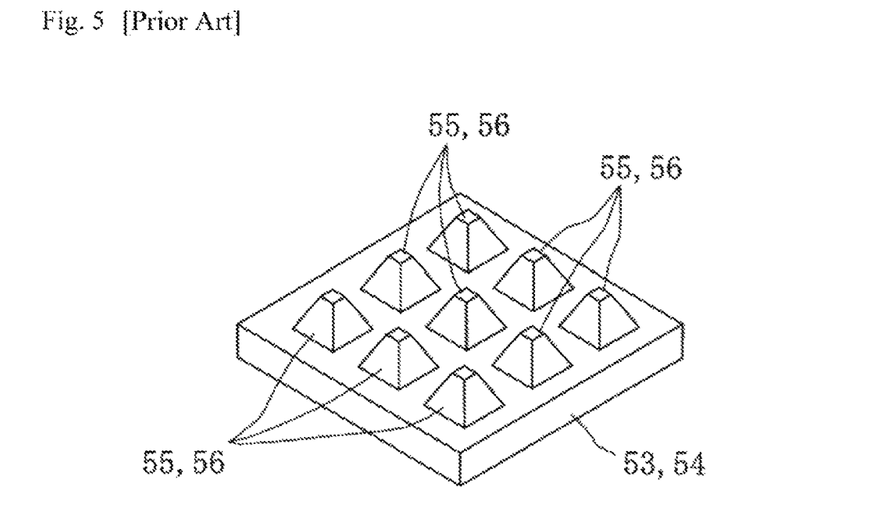
FIG. 5 is a perspective view showing truncated pyramidal protrusions serving as distal end portions of a conventional resonator and a conventional anvil for pressing down an object to be joined.

With reference to FIGS. 4 and 5, metal joining disclosed in Non-Patent Literature 1 (Principle of Ultrasonic Metal Joining (Technical Description), COSMO SYSTEM CO., LTD. [searched on Sep. 7, 2016: Internet: <URL:http://www.cosmo-stm.com/usmetal/about-us-metal-welding.html>]) will be described. In metal joining shown in FIG. 4, lateral ultrasonic vibration is applied to an object to be joined 52 composed of a plurality of metal members 51 stacked on one another by a resonator 53 while pressure is applied thereto by the resonator 53 and an anvil 54, so that friction occurs at an interface between the plurality of metal members 51 stacked together, motions of metal atoms are activated from heating due to frictional heat, migration of the metal atoms due to diffusion occurs, the metal atoms are bonded together by attraction force generated between the metal atoms, which results in joining of the plurality of metal members 51 stacked. A distal end portion 55 of the resonator 53 for pressing down the metal members 51 and a distal end portion 56 of the anvil 54 for pressing down the metal members 51 are constituted as pyramidal or truncated pyramidal protrusions gradually thinning in a direction of protruding from the side of the resonator 53 or the anvil 54, as shown in FIG. 5, and they grips the object to be joined 52 shown in FIG. 4.

In recent years, a lithium ion cell or the like has such a tendency that each of metal foils is made thinner and the number of metal foils to be joined is increased. When the thickness of the metal foil is made thinner and the number of metal foils to be joined is increased, such an event can occur that, as the distal end portions 55 and 56 composed of the pyramidal or truncated pyramidal protrusions are piercing the metal foils during joining, edges of adjacent faces crossing at each other of the distal end portions 55 and 56 are sharpened, which results in breaking of a metal foil(s) of the metal foils.

In order to prevent breaking of the metal foil(s) due to the distal end portions 55 and 56 composed of the pyramidal or truncated pyramidal protrusions, utilization of the invention for joining metal foils by ultrasonic vibration disclosed in paragraph [0027] to paragraph [0030] and FIG. 5 in Patent Literature 1 (WO2014/024802) is considered.

Figure 6:
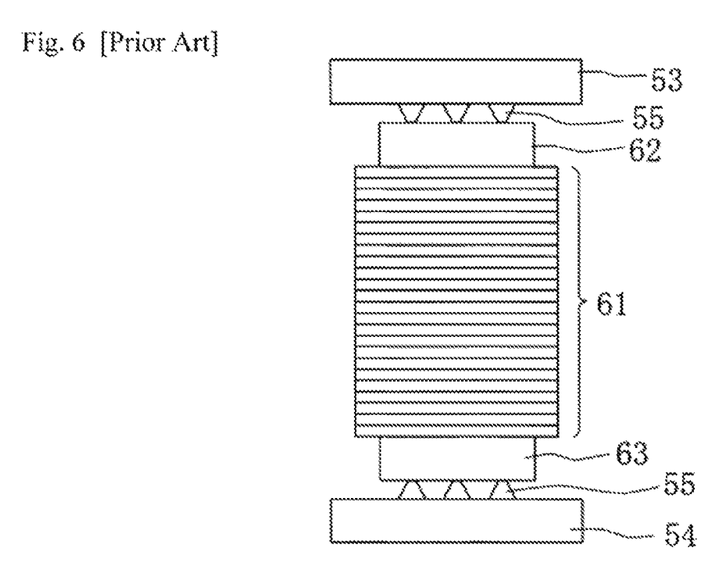
FIG. 6 is a schematic diagram showing metal joining utilizing the invention disclosed in Patent Literature 1.

With reference to FIG. 6, a case where a plurality of metal foils 61 are joined to one another by ultrasonic vibration by utilizing the invention disclosed in paragraph [0027] to paragraph [0030] and FIG. 5 in Patent Literature 1 will be described. As shown in FIG. 6, the plurality of metal foils 61 stacked are sandwiched by protection members 62 and 63 made of a metal sheet from above and below, the protection members 62 and 63 are sandwiched by the distal end portion 55 of the resonator 53 and the distal end portion 56 of the anvil 54 from above and below, pressure and ultrasonic vibration are applied to the metal foils 61 and the protection members 62 and 63 by the resonator 53 so that the metal foils 61 and the protection members 62 and 63 are joined to one another by ultrasonic vibration without the distal end portions 55 and 56 breaking the protection members 62 and 63 and the metal foils 61.

However, since a step of protecting the plurality of metal foils 61 stacked with the protection members 62 and 63 is added, the metal joining shown in FIG. 6 cannot be adopted as it is.

PRIOR ART LITERATURE

Patent Literature

[Patent Literature 1] WO2014/024802

Non-Patent Literature

[Non-Patent Literature 1] Principle of Ultrasonic Metal Joining (Technical Description), COSMO SYSTEM CO., LTD. [searched on Sep. 7, 2016: Internet: <URL:http://www.cosmo-stm.com/usmetal/about-us-metal-welding.html>]

SUMMARY OF INVENTION

The present invention has been made in view of the above-mentioned background art, and an object thereof is to provide a resonator for joining or a reception jig for joining where a shape of a distal end portion of the resonator for joining for pressing down an object to be joined or a shape of a distal end portion of the reception jig for joining for pressing down an object to be joined is devised so that joining of metal foils can be performed by ultrasonic vibration or acoustic vibration at least without a protection member protecting the metal foils from the distal end portions.

The present invention is directed to a resonator for joining or a reception jig for joining which are used for performing joining of an object to be joined by utilizing ultrasonic vibration or acoustic vibration, wherein a distal end portion on a side of the object to be joined of at least one of the resonator for joining and the reception jig for joining is so configured that a plurality of protrusions each having an outer face not including an angular sharp edge are stacked in two or more steps in a direction in which the resonator for joining and the reception jig for joining oppose to each other, and that a shape of a protrusion on the side of the object to be joined is made smaller than a shape of a protrusion on a side of the resonator for joining or a shape of a protrusion on a side of the reception jig for joining.

In the present invention, since the distal end portion of at least one of the resonator for joining and the reception jig for joining is so configured that a plurality of protrusions are stacked in two or more steps in a direction in which the resonator for joining and the reception jig for joining oppose to each other, and that a shape of a protrusion on a side of the object to be joined is made smaller than a shape of a protrusion on a side of the resonator for joining or shape of a protrusion on a side of the reception jig for joining. With this configuration, it is possible in a process of joining the object to be joined to first concentrate energy of acoustic vibration or ultrasonic vibration on a protrusion having a smaller shape serving as a first step protrusion to trigger to start displacement, then smoothly join, by the protrusion having a larger shape serving as second and later step protrusion, a part of the object to be joined existing around the protrusion having the smaller shape. Therefore, when a plurality of stacked metal foils are used as the objet to be joined, since the distal end portion does not break the metal foils at the time of joining, the plurality of stacked metal foils can be joined by ultrasonic vibration or acoustic vibration without a protection member protecting the metal foils from the distal end portions. In addition, in the present invention, when a root portion of the protrusion on the side of the object to be joined is formed in a concave arc-shaped face portion recessed from the outside of the resonator toward the side of the resonator for joining or the side of the reception jig for joining, a crack is prevented from being generated at a root portion of the protrusion on the side of the reception jig for joining and the finish of the joining can show a beautiful appearance in which the concave arc-shaped face portion of the root portion on the side of the reception jig for joining has been reflected. In addition, in the present invention, when the root portion of the protrusion on the side of the resonator for joining or on the side of the reception jig for joining is formed in a concave arc-shaped face portion recessed from the outside of the resonator toward the side of the resonator for joining or the side of the reception jig for joining, a crack is prevented from being generated at the root portion of the protrusion on the side of the resonator for joining or on the side of the reception jig for joining and the finish of the joining can show a beautiful appearance in which the concave arc-shaped face portion of the root portion has been reflected.

DETAILED DESCRIPTION OF INVENTION

Figure 1:
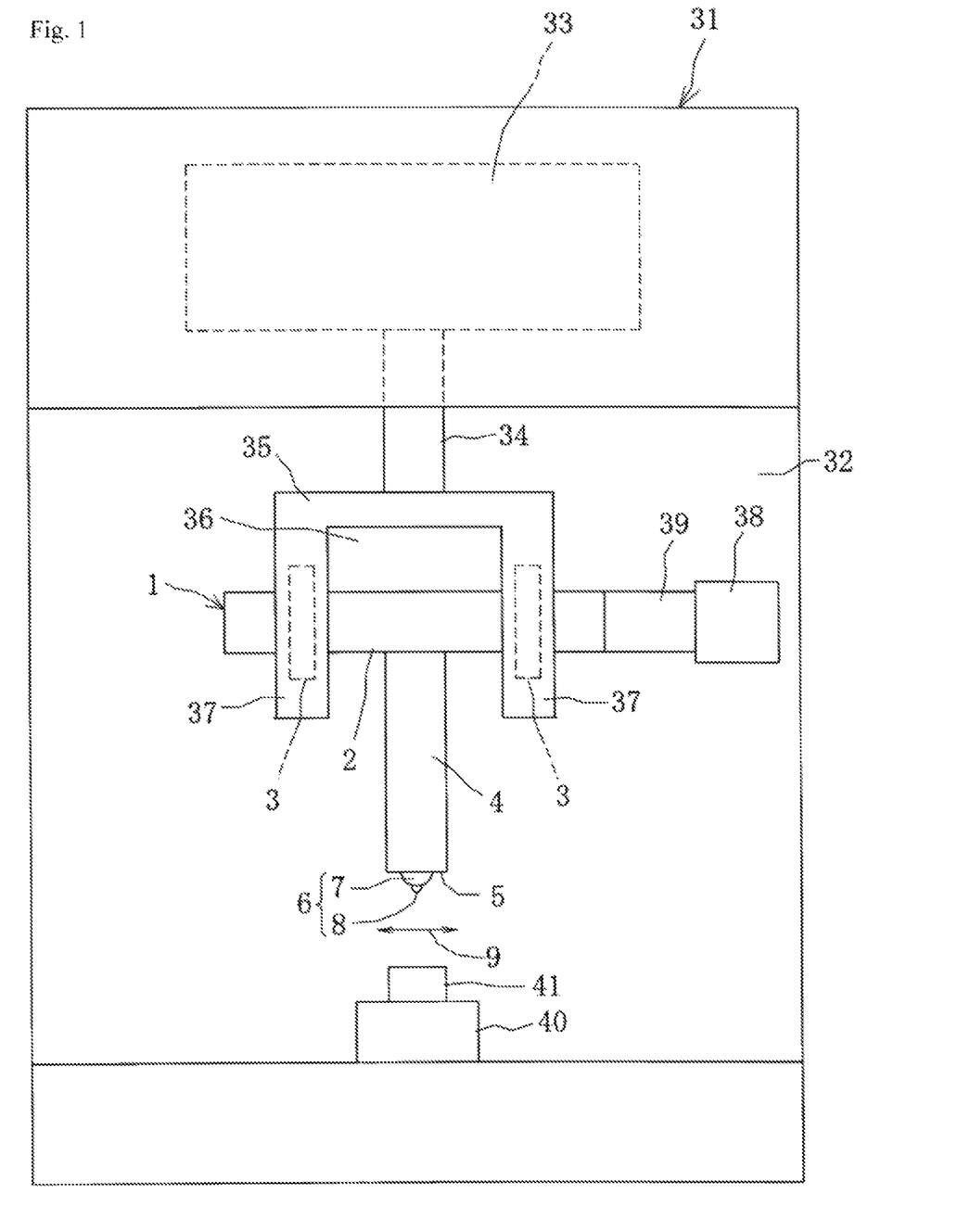
FIG. 1 is a view showing a joining device according to an embodiment for carrying out the present invention.

With reference to FIG. 1, a joining apparatus 31 utilizing ultrasonic vibration or acoustic vibration according to an embodiment for carrying out the invention will be described. A resonator 1 used for the joining apparatus 31 shown in FIG. 1 constitutes a resonator for joining 1 which joins an object to be joined 41 by utilizing ultrasonic vibration or acoustic vibration, thus expressed as a resonator 1 in this specification. The resonator 1 is made from aluminum alloy, titanium alloy, iron alloy or the like according to the purpose of joining, and is provided with a resonation main body portion 2, a supporting portion 3, and a joining tool portion 4. A workpiece-side face 5 of the joining tool portion 4 is a face to oppose the object to be joined 41 during the joining, and constitutes a lateral plane perpendicular to a center line extending in a vertical direction of the joining tool portion 4. On the workpiece-side face 5, a distal end portion 6 is provided. The number of the distal end portions 6 may be one or plural for one workpiece-side face 5.

The distal end portion 6 is a portion of the resonator 1 located on the side of the object to be joined 41 and pressed to the object to be joined 41 at the time of joining. The distal end portion 6 is so configured that semispherical or semicircular plural protrusions 7 and 8 each having an outer face which does not include an angular sharp edge are stacked in two steps in a vertical direction in which the resonator 1 and the reception jig 40 oppose to each other, and a shape of the protrusion 8 on the side of the object to be joined 41 is made smaller than that of the protrusion 7 on the side of the resonator 1. Since the size of the protrusion 8 on the side of the object to be joined 41 is made smaller than that of the protrusion 7 on the side of the resonator 1, the protrusion 7 on the side of the resonator 1 is expressed as a large protrusion 7 and the protrusion 8 on the side of the object to be joined 41 is expressed as a small protrusion 8. Furthermore, the small protrusion 8 is protruded from the large protrusion 7 toward the side of the object to be joined 41, so that the small protrusion 8 is brought into contact with the object to be joined 41 faster than the large protrusion 7, and so that when the plurality of metal foils stacked are used as the object to be joined 41, the metal foil(s) is not broken by the distal end portion 6 during the joining, which results in unnecessity of a step of protecting the plurality of stacked metal foils with a protection member. The number of the distal end portion 6 having the large protrusion 7 and the small protrusion 8 may be one or plural. When the number of distal end portion 6 is plural, each of the distal end portions 6 may have a different size or the same size.

A dimension of the joining tool portion 4 which protrudes downward from an outer face of the resonation main body portion 2 is set so as to have a maximum vibration amplitude point where the workpiece-side face 5 and the distal end portion 6 are vibrated with a maximum amplitude in lateral directions shown by arrow 9. Though a length of the resonation main body portion 2 from one end thereof in the lateral direction to the other end may have at least a length of a half wavelength of a resonation frequency of ultrasonic vibration or acoustic vibration transmitted from a vibrator 38, the resonation main body portion 2 illustrated here has a length of one wavelength. The resonation main body portion 2 may be in a round bar shape or a square bar shape. The maximum vibration amplitude points are located at both end portions and a central portion along the lengthwise direction of the resonation main body portion 2.

At the position of the maximum vibration amplitude point at the central portion of the resonation main body portion 2 in the lengthwise direction, the joining tool portion 4 is provided so as to protrude downward from the outer face of the resonation main body portion 2. When a dimension of the joining tool portion 4 which protrudes downward from the outer face of the resonation main body portion 2 is reduced, the joining tool portion 4 may be provided so as to protrude from the outer face of the resonation main body portion 2 in at least one direction of an upward direction, a forward direction, and a rearward direction.

The supporting portions 3 are provided at positions of minimum vibration amplitude points between the central portion and the both end portions in the lengthwise direction of the resonation main body portion 2 so as to protrude outward from the outer face of the resonation main body portion 2. The minimum vibration amplitude point is also called "nodal point". An embodiment of the supporting portion 3 protruding outward from the outer face of the resonation main body portion 2 will be clarified by referring to Paragraph [0013] and FIG. 2 of the publication of Japanese Patent No. 4564548.

When the resonation main body portion 2 is in a round bar shape, the supporting portion 3 may surround the resonation main body portion 2 in a circumferential direction of the resonation main body portion 2. The embodiment of the supporting portion 3 surrounding the resonation main body portion 2 in the circumferential direction will be clarified by referring to FIG. 5 or FIG. 18 of the publication of Japanese Patent No. 2911394.

The resonation main body portion 2 may have a structure where the central portion having the joining tool portion 4 and the both end portions having the supporting portions 3 are coaxially connected by a coupling such as a headless screw or a threaded rod, though such a structure is complicated.

The central portion having the joining tool portion 4 of the resonation main body portion 2 is expressed as horn, while the both end portions having the supporting portions 3 of the resonation main body portion 2 are expressed as booster.

The joining tool portion 4 may have a structure integrated with the resonation main body portion 2 or a structure separated from the resonation main body portion 2 and connected to the resonation main body portion 2 by a coupling such as a headless screw or a threaded rod. When the structure where the joining tool portion 4 is connected to the resonation main body portion 2 is adopted, the joining tool portion 4 may be connected to the resonation main body portion 2 by joining agent such as brazing material without using the coupling such as the headless screw or the threaded rod. Such a shape as a round bar shape or a square bar shape is applicable to a whole shape of the joining tool portion 4.

The joining apparatus 31 shown in FIG. 1 is provided with a pressure applying mechanism 33 at an upper portion of an apparatus frame body 32, and an output member 34 of the pressure applying mechanism 33 is provided with a holding tool 35. The holding tool 35 is provided with holding portions 37 at both lateral sides of the holding tool 35 corresponding to the right and left direction of a space portion 36 opening to a front-back direction and a downward direction. On the holding tool 35, the resonator 1, which joins the object to be joined 41 by utilizing ultrasonic vibration or acoustic vibration, is installed such that a lengthwise direction of the resonator 1 is aligned with lateral directions shown by arrow 9, portions of the resonator 1 except for supporting portions 3 are arranged outside the space portion 36 and the holding tool 35 so as not to contact the holding tool 35, and the supporting portions 3 are supported by the holding portions 37. Thereby, the resonator 1 having the vibrator 38 at one end thereof is horizontally attached in a bilaterally-supported manner to the holding tool 35 which can move upward and downward. Hereinafter, the resonator 1 for joining 1 is expressed as the resonator 1.

An output end portion 39 of the vibrator 38 is coaxially coupled to one lateral end portion of the resonator 1 by a coupling such as a headless screw or a threaded rod, so that the resonator 1 resonates with acoustic vibration or ultrasonic vibration transmitted from the vibrator 38. A reception jig 40 serving as an anvil is provided at a lower portion of the apparatus frame body 32 so as to be located just below the joining tool portion 4. The reception jig 40 used in the joining apparatus 31 shown in FIG. 1 constitutes a reception jig for joining 40 that joins the object to be joined 41 by utilizing ultrasonic vibration or acoustic vibration. Thus, the reception jig for joining 40 is expressed as the reception jig 40 in this specification. It should be noted that as the resonator 1, a resonator of a bilaterally-supported type where the supporting portions 3 are provided on both sides in a lateral direction from the joining tool portion 4 is shown but a resonator of a unilaterally-supported type where a supporting portion is provided on one side in the lateral direction from the joining tool portion 4 may be employed. However, as compared with the resonator 1 of the unilaterally-supported type, the resonator 1 of the bilaterally-supported type applies no unbalanced pressure to the object to be joined when pressure is applied to the object to be joined by the joining tool portion 4.

When joining of the object to be joined 41 is performed by the joining apparatus 31 shown in FIG. 1, a space into which the object to be joined 41 can be inserted is formed between the distal end portion 6 of the resonator 1 and the reception jig 40, and the object to be joined 41 is placed on the reception jig 40 with the distal end portion 6 of the resonator 1 and the reception jig 40 opposed to each other in the vertical direction. Next, the pressure applying mechanism 33 is driven to move the output member 34 downward, and accordingly the object to be joined 41 is clamped and pressed by the distal end portion 6 of the resonator 1 and the reception jig 40 from above and below, so that the resonator 1 resonates with acoustic vibration or ultrasonic vibration transmitted from the vibrator 38, the distal end portion 6 of the resonator 1 vibrates in lateral directions shown by arrow 9, regions to be joined of the object to be joined 41 are joined under pressure and vibration energy from the distal end portion 6. Thereafter, the pressure applying mechanism 33 is driven to move the output member 34 upward and accordingly the distal end portion 6 is separated from the object to be joined 41, so that the object to be joined 41 is left on the reception jig 40. Then, the object to be joined 41 is removed from the reception jig 40, and one joining action on the object to be joined 41 is thus completed.

As shown in FIG. 1, the distal end portion 6 is so configured that the large protrusion 7 having an outer face which does not include an angular sharp edge and the small protrusion 8 having an outer face which does not include an angular sharp edge, which is smaller than the large protrusion 7 and which protrudes from the large protrusion 7 toward the object to be joined 41, are stacked in two steps in the vertical direction. With this configuration, it is possible in a process of joining the object to be joined 41 to first concentrate energy of acoustic vibration or ultrasonic vibration on the small protrusion 8 serving as a first step protrusion to trigger to start displacement, then smoothly join by the large protrusion 7 a part of the object to be joined existing around the small protrusion 8. As a result, joining can be performed with a smaller energy of acoustic vibration or ultrasonic vibration, that is, with a small vibration amplitude, a small lord and a shortened time. In addition, as the energy of acoustic vibration or ultrasonic vibration is concentrated on the small protrusion 8, joining strength is improved and yield of joining gets better. These effects are most prominent when joining is performed with vertical vibration fixed to 15 KHz as one of the frequencies within the range of 10 KHz to 50 KHz, as acoustic vibration or ultrasonic vibration used in joining by the joining apparatus 31 shown in FIG. 1.

It could have been successfully confirmed that, when joining is performed with vertical vibration fixed to 15 KHz as one of the frequencies within the range of 10 KHz to 50 KHz as acoustic vibration or ultrasonic vibration used in joining by the joining apparatus 31 shown in FIG. 1, the following configurations can be used as the object to be joined 41 used in the joining apparatus 31. Namely, a configuration of joining between resins where a plurality of synthetic resin members formed from thermoplastic synthetic resin are stacked, a configuration of joining between metals where a plurality of metal members of the same kind or different kinds are stacked, a configuration of joining between different materials where a resin pad(s) is(are) stacked on either top or bottom or both top and bottom of a plurality of metal members of the same kind or different kinds, a configuration of joining between different materials where a metal member and a ceramic member are stacked, a configuration of joining between different materials where a resin pad is stacked on either top or bottom or both top and bottom of a metal member and a ceramic member arranged in a stack, a configuration of joining between different materials where a metal member and a synthetic resin member are stacked, and a configuration of joining between different materials where a resin pad is stacked on either top or bottom or both top and bottom of a metal member and a synthetic resin member arranged in a stack, or the like can be used.

In particular, even when a plurality of metal foils formed from aluminum, copper or the like are arranged in a stack as the object to be joined 41, the metal foil(s) is(are) not broken during joining by the distal end portion 6, since the distal end portion 6 of the resonator 1 for pressing down the metal foils is provided as the two-step configuration of the large protrusion 7 and the small protrusion 8. When 60 copper foils each having a thickness of 10 μm as metal foils were stacked and joined by the joining apparatus 31 shown in FIG. 1 with the vertical vibration fixed to 15 KHz, or when 60 aluminum foils each having a thickness of 20 μm as metal foils were stacked and joined by the joining apparatus 31 shown in FIG. 1 with the vertical vibration fixed to 15 KHz, it was successfully confirmed that breaking of the copper foil(s) and the aluminum foil(s) did not occur.

An intermediate booster (not shown) may be laterally, coaxially and integrally connected between a central portion having the joining tool portion 4 and both end portions each having the supporting portion 3 of the resonator 1, between the resonator 1 and the joining tool portion 4, or between the resonator 1 and the output end portion 39 of the vibrator 38 by a coupling such as a headless screw or a threaded rod. The intermediate booster is to adjust the amplitude of the resonator 1. By changing the magnitude (the shape) of the intermediate booster, the amplitude of the resonator 1 can be made large or small. When the intermediate booster is not used, the amplitude of the resonator 1 is the same as that of the vibrator 38, namely 1 time as large. However, a 1× magnification intermediate booster may be used.

As the joining apparatus 31, a joining apparatus disclosed in Japanese Patent No. 2911395 where a resonator is arranged in a vertical position is applicable.

A peripheral protrusion (not shown) may be provided around the distal end portion 6, which is configured in two-step by the large protrusion 7 and the small protrusion 8, on the workpiece-side face 5 shown in FIG. 1. A size of the not-shown peripheral protrusion protruded from the workpiece-side face 5 is smaller than the size of the distal end portion 6 protruded from the workpiece-side face 5, and therefore, at the time of joining, the not-shown peripheral protrusion can press down and join the object to be joined 41 without breaking the object to be joined 41.

FIG. 1 shows the resonator 1, as an example, in which the distal end portion 6 is so configured that the protrusions 7 and 8 are stacked in two steps in the direction in which the resonator 1 and the reception jig 40 oppose to each other, however, a structure in which a plurality of protrusions are stacked in three or more steps in the direction in which the resonator 1 and the reception jig 40 oppose to each other may be similarly applicable. For example, in a structure in which a plurality of protrusions are stacked in three steps in the direction in which the resonator 1 and the reception jig 40 oppose to each other, a protrusion closest to the side of the object to be joined 41 has the smallest shape, a protrusion closest to the side of the resonator 1 has the largest shape, and a protrusion located between the protrusion closest to the side of the object to be joined 41 and the protrusion closest to the side of the resonator 1 has a shape larger than the smallest protrusion closest to the side of the object to be joined 41 and smaller than the largest protrusion closest to the side of the resonator 1. In the structure in which a plurality of protrusions are stacked in three or more steps in the direction in which the resonator 1 and the reception jig 40 oppose to each other, the shape of the respective protrusions is made smaller from the side of the resonator 1 toward the side of the object to be joined 41. Furthermore, the distal end portion 6 having a plurality of protrusions stacked in two steps or three or more steps may be provided in plural number to one workpiece-side face 5 of the resonator 1.

A structure may be applicable in which the distal end portion of the reception jig 40 on the side of the object to be joined 41 has the protrusions 7 and 8 stacked in two steps in the direction in which the resonator 1 and the reception jig 40 oppose to each other as shown in FIG. 1. For example, in a case where the distal end portion 6 provided on the workpiece-side face of the reception jig 40 has the protrusions 7 and 8 stacked in two steps in the direction in which the resonator 1 and the reception jig 40 oppose to each other, the protrusion 8 on the side of the object to be joined 41 has the shape smaller than that of the protrusion 7 on the side of the resonator 1. Also, a structure may be applicable in which the distal end portion of the reception jig 40 on the side of the object to be joined 41 has a plurality of protrusions stacked in three or more steps in the direction in which the resonator 1 and the reception jig 40 oppose to each other. For example, in the structure in which the plurality of protrusions are stacked in three steps in the direction in which the resonator 1 and the reception jig 40 oppose to each other, a protrusion closest to the object to be joined 41 has the smallest shape, a protrusion closest to the side of the reception jig 40 has the largest shape, and a protrusion located between the protrusion closest to the side of the object to be joined 41 and the protrusion closest to the side of the receiving jog 40 has a shape larger than the smallest protrusion closest to the side of the object to be joined 41 and smaller than the largest protrusion closest to the side of the reception jig 40. In such a structure in which the distal end portion of the reception jig 40 is configured to have the plurality of protrusions stacked in three or more steps in the direction in which the resonator 1 and the reception jig 40 oppose to each other, the shape of the respective protrusions is made smaller from the side of the reception jig 40 toward the side of the object to be joined 41. The distal end portion having the protrusions stacked in two steps or three or more steps may be provided in plural number to one workpiece-side face of the reception jig 40. A peripheral protrusion, which is not shown, may be provided around the distal end portion 6 of the reception jig 40 having the protrusions 7 and 8 stacked in two steps. A size of the not-shown peripheral protrusion protruded from the upper face of the reception jig 40 is smaller than the size of the distal end portion 6 protruded from the upper face of the reception jig 40, and therefore, at the time of joining, the not-shown peripheral protrusion can press down and join the object to be joined 41 without breaking the object to be joined 41.

The distal end portion having a plurality of protrusions stacked in two steps or three or more steps may be provided in one of or both of the resonator 1 and the reception jig 40. In FIG. 1, the object to be joined 41 may be joined by the joining apparatus 31 configured such that the reception jig 40 is provided on the upper part of the apparatus frame body 32 and the resonator 1 and the holding tool 35 are provided on the lower part of the apparatus frame body 32, by removing the holding tool 35 from the output member 34, removing the reception jig 40 from the apparatus frame body 32, placing the removed holding tool 35 on the lower part of the apparatus frame body 32 so that the distal end portion 6 faces upward, and attaching the removed reception jig 40 to the output member 34 so that the distal end portion of the reception jig 40 faces downward.

Figure 2A:
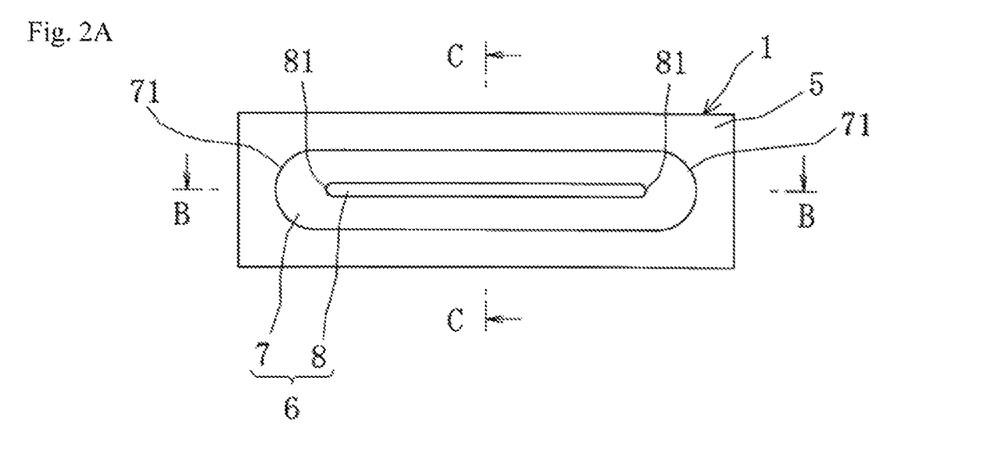
FIGS. 2A to 2C show a distal end portion of a resonator for joining according to the embodiment for carrying out the present invention, FIG. 2A being a bottom view, FIG. 2B being a sectional view taken along line B-B of FIG. 2A, and FIG. 2C being a sectional view taken along line C-C of FIG. 2A.

With reference to FIGS. 2A to 2C, a structure in which the large protrusion 7 and the small protrusion 8 are stacked in two steps as the distal end portion 6 of the resonator 1 according to the embodiment for carrying out the invention will be described. As shown in FIG. 2A, when the distal end portion 6 is viewed from the bottom face, the large protrusion 7 is hog-backed, but it may be circular-shape. The outer face of the both sides in the longitudinal direction of the hog-backed large protrusion 7 is configured as a convex arc-shaped face portion 71. The convex arc-shaped face portion 71 draws a smooth convex circular arc from the side of a center line extending in a longitudinal direction of the outer face of the large protrusion 7 toward both sides in a direction perpendicular to the center line extending in the longitudinal direction of the outer face of the large protrusion 7, and circumscribes both sides in the transverse direction of the large protrusion 7, so as to make a semicircle around the large protrusion 7 in a horizontal plane perpendicular to the center line extending in the longitudinal direction of the outer face of the large protrusion 7, centering on the center line extending in the longitudinal direction of the outer face of the large protrusion 7. The small protrusion 8 is hog-backed which is similar to and smaller than the large protrusion 7, but it may be circular-shape. The outer face of the both sides in the longitudinal direction of the small protrusion 8 is configured as a convex arc-shaped face portion 81. The convex arc-shaped face portion 81 draws a smooth convex circular arc from the side of a center line extending in the longitudinal direction of the outer face of the small protrusion 8 toward both sides in a direction perpendicular to the center line extending in the longitudinal direction of the outer face of the small protrusion 8, and circumscribes both sides in the transverse direction of the small protrusion 8, so as to make a semicircle around the small protrusion 8 in a horizontal plane perpendicular to the center line extending in the longitudinal direction of the outer face of the small protrusion 8, centering on the center line extending in the longitudinal direction of the outer face of the protrusion 8 In FIG. 2A, a configuration in which the small protrusion 8 is divided into plural number in the longitudinal direction may be applicable, that is, a plurality of small protrusions 8 may be provided in one large protrusion 7.

Figure 2B:
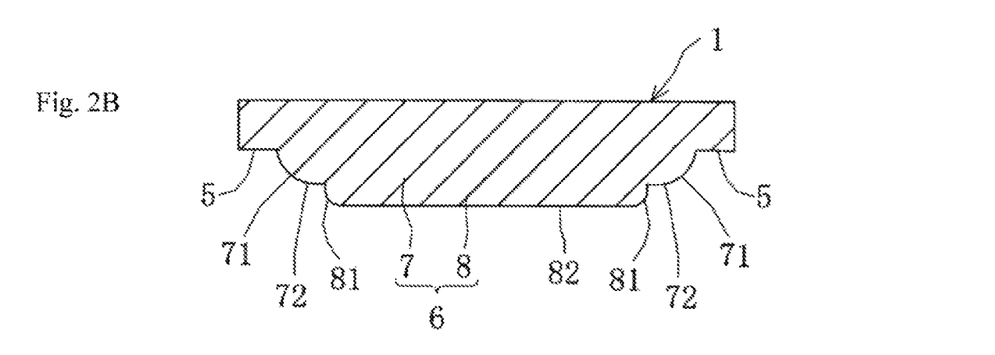

As shown in FIG. 2B, the convex arc-shaped face portion 71 draws a smooth convex circular arc from the workpiece side face 5 toward the side of a central portion of the outer face of the large protrusion 7, smoothly connects without a difference in level to the convex arc-shaped portion 72 constituted as an outer face in the transverse direction of the large protrusion 7 and reaches to the workpiece-side face 5, so as to make a quadrant around the larger protrusion 7 in a vertical plane on a center line extending in the vertical direction of the outer face on the side of both end portions of the protrusion 7, centering on a center line extending in a vertical direction of the outer face of the protrusion 7. That is, outer faces at both end portions in the longitudinal direction of the large protrusion 7 are composed of the convex arc-shaped face portions 71 shown in FIG. 2B to constitute convex circular arc faces protruding outward from the side of the resonator 1 and not including any angular sharp edge. A position of the central portion for depicting the convex arc-shaped face of the convex arc-shaped face portion 71 in the vertical direction may be the same position as the workpiece-side face 5 or may be a position different from the workpiece-side face 5. Further, the convex arc-shaped face portion 81 draws a smooth convex circular arc from the workpiece-side face 5 toward the side of a central portion of the outer face of the small protrusion 8, smoothly connects without a difference in level to the convex arc-shaped portion 82 constituted as an outer face in the transverse direction of the small protrusion 8 and reaches to the convex arc-shaped face portion 72, so as to make a quadrant around the small protrusion 8 in a vertical plane on the center line extending in the vertical direction of the outer face on the side of the both end portions of the small protrusion 8, centering on a center line extending in a vertical direction of the outer face of the protrusion 8. That is, outer faces at both end portions in the longitudinal direction of the small protrusion 8 are composed of the convex arc-shaped face portions 81 shown in FIG. 2B to constitute convex circular arc faces protruding outward from the side of the resonator 1 and not including any angular sharp edge. A position of the central portion for depicting the convex arc-shaped face of the convex arc-shaped face portion 81 in the vertical direction may be the same position as the convex arc-shaped face portion 72 or may be a position different from the convex arc-shaped face portion 72.

Figure 2C:
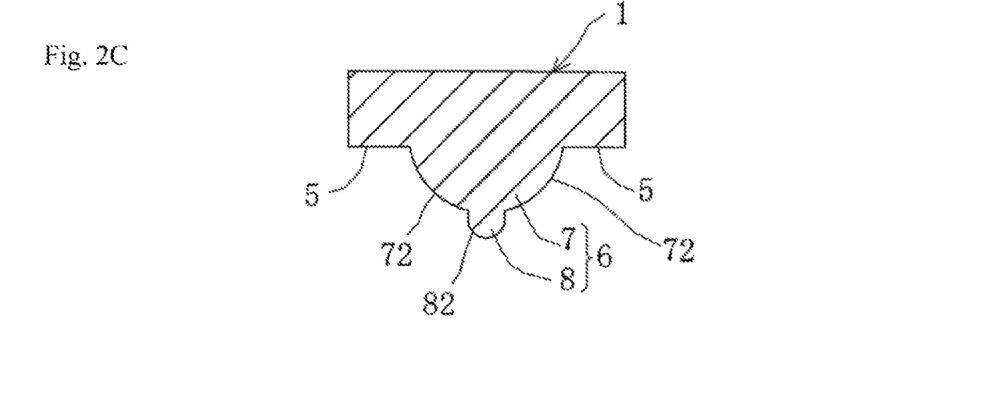

As shown in FIG. 2C, the outer face in the transverse direction of the large protrusion 7 is constituted as the convex arc-shaped face portion 72. The convex arc-shaped face portion 72 draws a smooth convex circular arc from the workpiece-side face 5 toward the side of a central portion of the outer face of the large protrusion 7 and reaches to the workpiece-side face 5, so as to make a semicircle around the large protrusion 7 in a vertical plane on a center line extending in the vertical direction of the outer face on the side of the intermediate portion of the large protrusion 7, centering on a center line extending in the vertical direction of the outer face of the large protrusion 7. That is, outer faces of the large protrusion 7 are composed of the convex arc-shaped face portions 71 and 72 shown in FIGS. 2B and 2C, which are smoothly connected without a difference in level to each other, to constitute convex circular arc faces protruding downward from the workpiece-side face 5 and not including any angular sharp edge. Furthermore, the outer face in the transverse direction of the small protrusion 8 is constituted as the convex arc-shaped face portion 82. The convex arc-shaped face portion 82 draws a smooth convex circular arc from the large protrusion 7 toward the side of a central portion of the outer face of the small protrusion 8 and reaches to the convex arc-shaped face portion 72, so as to make a semicircle around the small protrusion 8 in a vertical plane on a center line extending in the vertical direction of the outer face on the side of the intermediate portion of the small protrusion 8, centering on the center line extending in the vertical direction of the outer face of the small protrusion 8. That is, outer faces of the small protrusion 8 are composed of the convex arc-shaped face portions 81 and 82 shown in FIGS. 2B and 2C, which are smoothly connected without a difference in level to each other, to constitute convex circular arc faces protruding downward from the large protrusion 7 and not including any angular sharp edge.

Figure 3A:
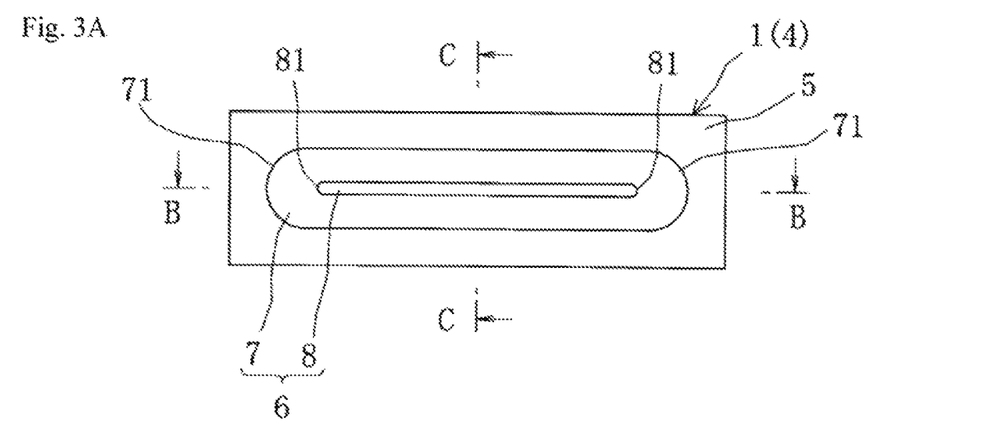
FIGS. 3A to 3C show the distal end portion of the resonator for joining illustrating a structure different from that shown in FIG. 2 according to the embodiment for carrying out the present invention, FIG. 3A being a bottom view, FIG. 3B being a sectional view taken along line B-B of FIG. 3A, and FIG. 3C being a sectional view taken along line C-C of FIG. 3A.
Figure 3B:
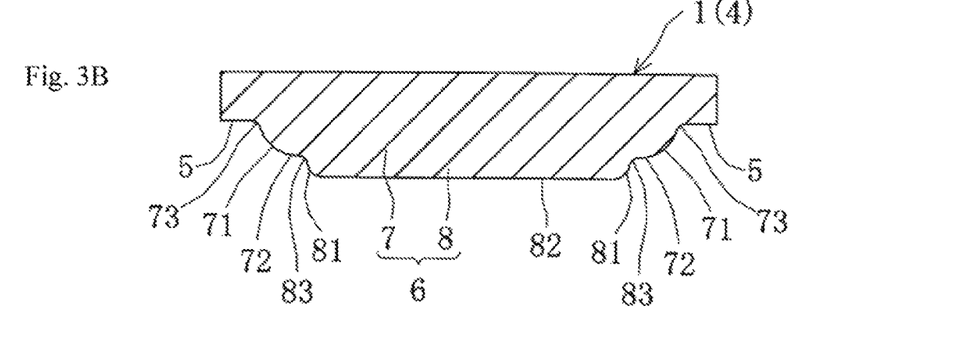
Figure 3C:
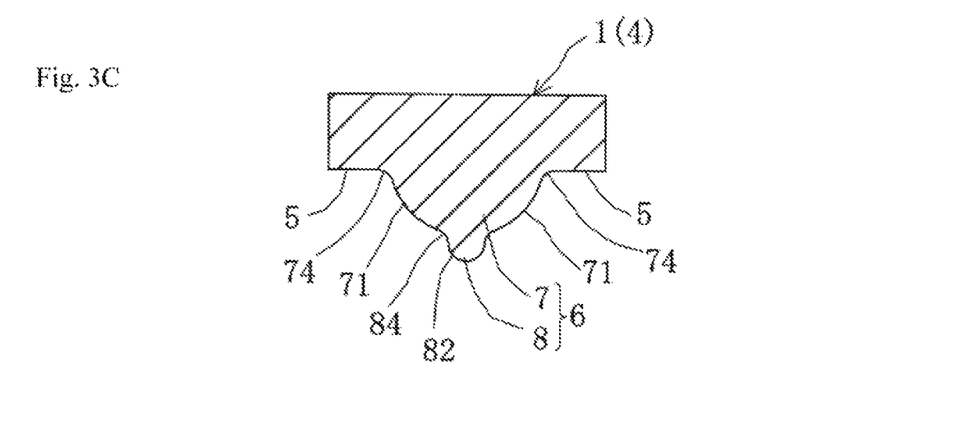

With reference to FIGS. 3A to 3C, a difference of a shape of a root portion of the large protrusion 7 on the side of the resonator 1 from that shown in FIGS. 2B and 2C, and a difference of a shape of a root portion of the small protrusion 8 on the side of the large protrusion 7 from that shown in FIGS. 2B and 2C according to the embodiment for carrying out the invention will be described. As shown in FIG. 3B, the root portion in the longitudinal direction of the large protrusion 7 is constituted as a concave arc-shaped face portion 73. The concave arc-shaped face portion 73 draws a smooth concave circular arc from the side of the large protrusion 7 toward the workpiece-side face 5 side and circumscribes the convex arc-shaped face portion 71 and the workpiece-side face 5. That is, the root portion of the large protrusion 7 constitutes a concave circular arc face recessing from the outer side toward the side of the resonator 1 and not including any angular sharp edge due to the concave arc-shaped face portion 73. The root portion of the small protrusion 8 is constituted as the concave circular arc face 83. The concave arc-shaped face portion 83 draws a smooth concave circular arc from the side of the small protrusion 8 toward the side of the large protrusion 7 and circumscribes the convex arc-shaped face portion 81 and the convex arc-shaped face portion 72. That is, the root portion on the side in the longitudinal direction of the small protrusion 8 constitutes a concave circular arc face recessing from the outer side toward the resonator 1 and not including any angular sharp edge due to the concave arc-shaped face portion 83.

As shown in FIG. 3C, a root portion in the transverse direction of the large protrusion 7 is constituted as a concave arc-shaped face portion 74. The concave arc-shaped face portion 74 draws a smooth concave circular arc from the side of the large protrusion 7 toward the workpiece-side face 5 and circumscribes the convex arc-shaped face portion 71 and the workpiece-side face 5. That is, the root portion of the large protrusion 7 constitute a concave circular arc face recessed from the outer side toward the side of the resonator 1 and not including an angular sharp edge due to that the concave arc-shaped face portions 73 and 74 shown in FIGS. 3B and 3C are smoothly connected to each other. Thereby, any crack due to ultrasonic vibration or acoustic vibration during joining is not generated at the root portion of the large protrusion 7. A root portion in the transverse direction of the small protrusion 8 is constituted as a concave arc-shaped face portion 84. The concave arc-shaped face portion 84 draws a smooth concave circular arc from the side of the small protrusion 8 toward the side of the large protrusion 7 and circumscribes the convex arc-shaped face portions 71 and 82. That is, the root portion of the small protrusion 8 constitute a concave circular arc face recessed from the outer side toward the side of the resonator 1 and not including an angular sharp edge due to that the concave arc-shaped face portions 83 and 84 shown in FIGS. 3B and 3C are smoothly connected to each other. Thereby, any crack due to ultrasonic vibration or acoustic vibration during joining is not generated at the root portion of the small protrusion 8.

What is claimed is:

1. A resonator for joining or a reception jig for joining for performing joining of an object to be joined by utilizing ultrasonic vibration or acoustic vibration, wherein a distal end portion on a side of the object to be joined of at least one of the resonator for joining and the reception jig for joining is so configured that a plurality of protrusions each having an outer face not including an angular shape edge are stacked in two or more steps in a direction in which the resonator for joining and the reception jig for joining oppose to each other, and that a shape of a protrusion on the side of the object to be joined is made smaller than a shape of a protrusion on a side of the resonator for joining or a shape of a protrusion on a side of the reception jig for joining.

2. The resonator for joining or the reception jig for joining according to claim 1, wherein a root portion of the protrusion on the side of the object to be joined is constituted as a concave arc-shaped face portion recessed from an outer side of the resonator toward the side of the resonator for joining or toward the side of the reception jig for joining.

3. The resonator for joining or the reception jig for joining according to claim 1, wherein a root portion of the protrusion on the side of the resonator for joining or on the side of the reception jig for joining is constituted as a concave arc-shaped face portion recessed from an outer side of the resonator toward the side of the resonator for joining or toward the side of the reception jig for joining.

* * * * *